United States Patent [19]

Kushima

[11] Patent Number: 4,785,166
[45] Date of Patent: Nov. 15, 1988

[54] READER/WRITER FOR PORTABLE RECORDING MEDIUM WITH POWER SUPPLY ABNORMALITY DETECTION

[75] Inventor: Hidekiyo Kushima, Yokohama, Japan

[73] Assignee: Kabushiki Kaisha Toshiba, Kanagawa, Japan

[21] Appl. No.: 859,999

[22] Filed: May 5, 1986

[30] Foreign Application Priority Data

Oct. 31, 1985 [JP] Japan ................ 60-245063

[51] Int. Cl.$^4$ .................... G06K 7/01; G06K 7/06
[52] U.S. Cl. ................... 235/441; 235/492; 235/438; 235/380
[58] Field of Search ............ 235/441, 492, 438, 439, 235/443, 380, 437; 361/3, 6, 88; 371/66, 22; 323/238, 321, 901, 908; 365/226; 307/200 A

[56] References Cited

U.S. PATENT DOCUMENTS

| | | | |
|---|---|---|---|
| 3,935,527 | 1/1976 | Michelet et al. | 323/908 |
| 4,307,440 | 12/1981 | Inoue et al. | 323/901 |
| 4,538,058 | 8/1985 | Ugon et al. | 235/380 |
| 4,602,351 | 7/1986 | Shimamura et al. | 235/441 |
| 4,628,431 | 12/1986 | Kayser | 323/901 |
| 4,675,516 | 6/1987 | Guion | 235/492 |

Primary Examiner—Alan Faber
Assistant Examiner—Robert A. Weinhardt
Attorney, Agent, or Firm—Finnegan, Henderson, Farabow, Garrett and Dunner

[57] ABSTRACT

A reader/writer for IC card according to the present invention is for carrying out transfer of information between the IC card by supplying an operating power to the IC card through its connection with the IC card, and it comprises a power supply circuit for supplying an operating power to the IC card, a current limiting circuit connected in series to the power supply circuit, for limiting the current that is supplied from the power supply circuit to the IC card to values below a predetermined value, an abnormality detection circuit for detecting abnormality in the supply of the operating power to the IC card, and a control circuit which supplies a first operating power from the power supply circuit to the portable recording medium via the current limiting circuit, when the IC card is first connected, and controls to supply a second operating power which is larger than the first operating power to the IC card from the power supply circuit, only when the supply of the first operating power is found normal without detection of abnormality by the abnormality detection circuit.

16 Claims, 6 Drawing Sheets

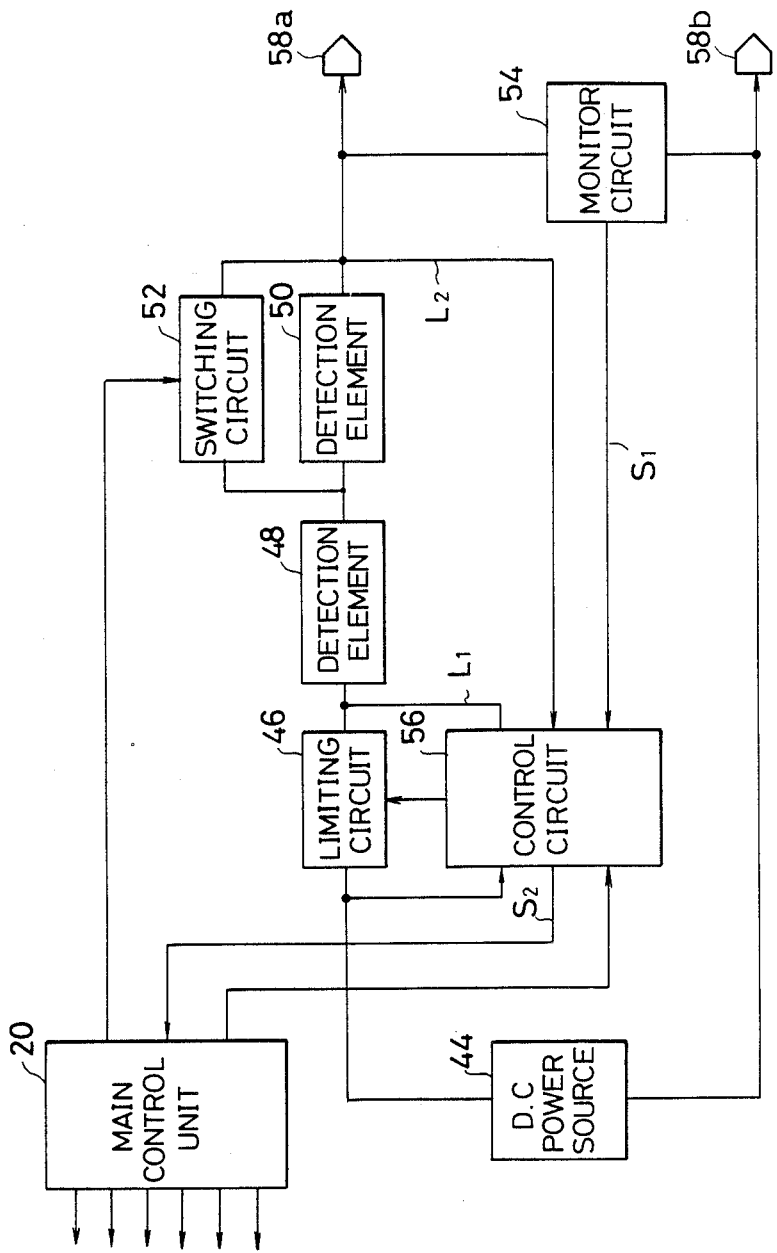

READER/WRITER FOR PORTABLE RECORDING MEDIUM WITH POWER SUPPLY ABNORMALITY DETECTION

BACKGROUND OF THE INVENTION

1. Field of the Invention

The present invention relates to a reader/writer for a portable recording medium such as an IC card, in particular, to a reader/writer for a portable recording medium which is capable of preventing welding of the power supply unit or breakdown of the device, even when an excess current flows in the power supply unit of the IC card due to short-circuiting failure or the like.

2. Description of the Prior Art

A portable recording medium such as an IC card is constructed by embedding an IC card chip such as memory or microcomputer in a plastic card of credit card size. An IC card has a large memory capacity and is equipped with a control unit such as microcomputer, so that it is suited for memorizing various information, data, and others that require a large memory capacity. Moreover, since its size is adequate for carrying, the device may be considered for various uses such as shopping card and medical examination card, with some of these ideas being put to practical use already.

An IC card is formed with a plurality of terminals exposed on its exterior surface. When an IC card is inserted to a read and write device (referred to as card reader/writer hereafter), the contacts provided in the contact section of the card reader/writer and the corresponding terminals of the IC card are brought to an electrical contact, establishing a supply of operating power from the card reader/writer as well as carrying out the transfer of the data.

However, when something with size of a card is inserted to it, the prior reader/writer transports it, whatever it may be, to the contact section in the interior, causes the contacts in the contact section to be brought to a contact with the inserted body, and carries out supply of power and transfer of data. Because of this, a foreign body like an iron plate is inserted to it, it may lead to the welding of the contacts or to the damages to the card reader/writer due to short-circuiting between the contacts or between the terminals. In order to prevent such a thing from happening, there have been developed card readers/writers that can disconnect the power source, by providing an excess current preventive circuit in them. In such a device, however, the value of the excess current to be detected is generally set at somewhat higher value, so that it is insufficient for preventing the welding of the contacts or the like.

SUMMARY OF THE INVENTION

An object of the present invention is to provide a reader/writer for portable recording medium which is capable of preventing welding of the power supply terminals even when there flows an excess current in the power supply unit for the IC card because of the malfunction due to short-circuiting or the like.

Another object of the present invention is to provide a reader/writer for portable recording medium which is capable of preventing damages to the device even when an excess current flows in the power supply unit to the IC card.

One of the features of the present invention resides in a reader/writer for portable recording medium for carrying out supply of power to the portable recording medium and transfer of recording data, by bringing a plurality of external terminals provided on the portable recording medium to contact with the corresponding contacts, comprising: a current control means for limiting the power source current that is supplied to the power supply contacts; an abnormality detection means for detecting abnormality in the power source for the power source contacts; and a switching and controlling means for switching and controlling the current control means in such a way as to let the power source current to be low when the power supply contacts first make contact with the corresponding external terminals, and then let the power source current increase when, subsequent to the contact, there is not detected abnormality by the abnormality detection means.

Another feature of the present invention resides in a reader/writer for portable recording medium that carries out the transfer of information with the portable recording medium by supplying an operating power to the portable recording medium through contact with the portable recording medium, comprising: a first power supplying means for supplying a first operating power to the portable recording medium, a second power supplying means that is connected in parallel to the first power supplying means, for supplying a second operating power to the portable recording medium, a current limiting means that is connected directly to the first power supplying means for limiting the current, to be supplied from the first power supplying means to the portable recording medium, to values below a predetermined level, and a control means for supplying the first operating power from the first power supplying means to the portable recording medium via the current limiting means when the portable recording medium is first connected, and then supplying the second operating power directly to the portable recording medium from the second power supplying means when the supply of the first operating power is found to be normal.

These and other objects, features and advantages of the present invention will be more apparent from the following description of a preferred embodiment, taken in conjunction with the accompanying drawings.

BRIEF DESCRIPTION OF THE DRAWINGS

FIG. 4 is a block diagram for the power circuit unit in the IC card reader/writer shown in FIG. 2;

DESCRIPTION OF THE PREFERRED EMBODIMENTS

Figure 1:
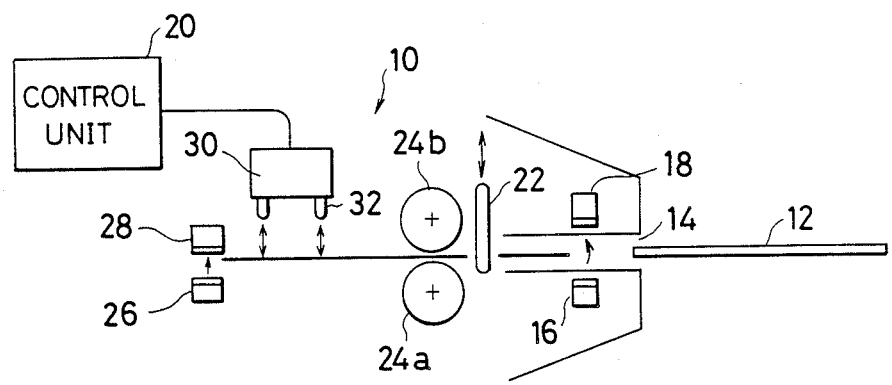
FIG. 1 is an overall block diagram for an IC card reader/writer embodying the present invention.
Figure 2:
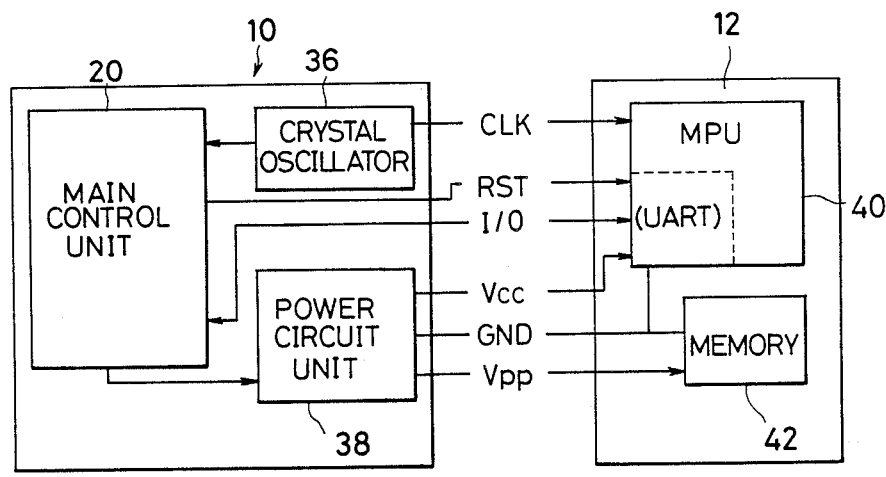
FIG. 2 is a block diagram for illustrating the construction in the connected state between the IC card reader/writer shown in FIG. 1 and the IC card.

Referring to FIGS. 1 and 2, a simplified construction of an IC card and an IC card reader/writer embodying the present invention will be described.

As shown in FIG. 1, the IC card reader/writer 10 has an insertion opening 14 of the IC card 12, and on the bottom and top surfaces on the inside of the insertion opening 14 there are arranged facing each other a light-emitting element 16 and a light-receiving element, respectively. The insertion of the IC card 12 is detected by the shielding of light from the light-emitting element 16 by the IC card 12. The detection signal is supplied to a main control unit 20 consisting of a microprocessor or the like. A drive signal is supplied from the main control unit 20 to a shutter drive circuit (not shown), which opens the shutter 22. At the same time, a drive signal is supplied to a roller drive circuit which causes the pinch rollers 24a and 24b to rotate to introduce the IC card 12 to the interior of the card reader/writer 10.

On the bottom and top surfaces in the inside of the IC card reader/writer 10 there are arranged facing each other a light-emitting element 26 and a light-receiving element 28 for detecting the tip of the IC card 12. The tip section of the IC card 12 is detected by shielding light from the light-emitting element 26 by the IC car introduced there. With this, the rotation of the pinch rollors 24a and 24b is interrupted and the IC card 12 is stopped at the position for read and write.

When the IC card is stopped, a driving signal is supplied from the main control unit to a contact driving circuit (not shown). As a result, a contact block 30 is lowered, and causes each of the contacts provided on the contact block 30 to be pressed against each of the corresponding contact terminals 34 of the IC card 12, establishing electrical connection between the card reader/writer 10 and the IC card 12.

Figure 3:
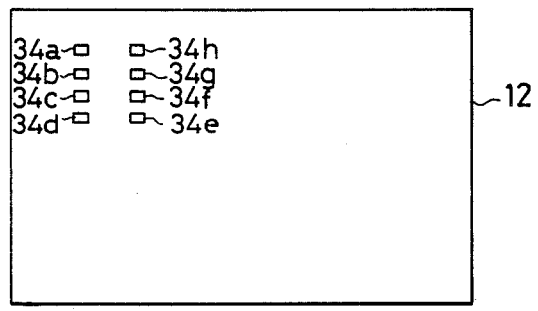
FIG. 3 is a plan view for showing the junctures in the IC card shown in FIG. 2.
Figure 5:
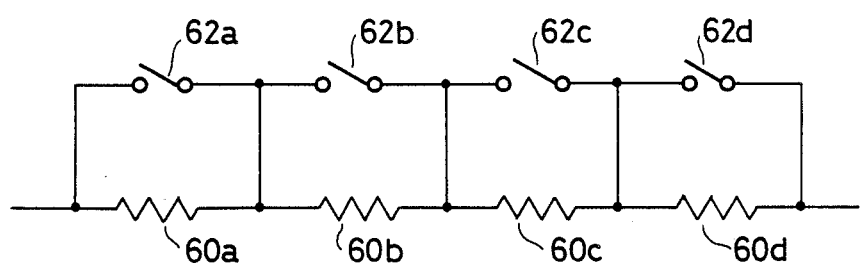
FIG. 5 is circuit diagram for a modification of the power circuit to the first embodiment shown in FIG. 4.

As shown in FIG. 2, the card reader/writer 10 further includes, in addition to the main control unit 20, a crystal oscillator 36 for generating clock pulses and a power circuit unit 38 for supplying power to the IC card 12 by the control of the main control unit 20. Further, the IC card 12 includes a control unit 40 that consists of a microprocessor unit or the like, and a memory 42. On the outer surface of the IC card 12 there are formed eight contact terminals 34a to 34h exposed to the outside, as shown in FIG. 3. The contact 34a is for supplying the operating power Vcc, the contact terminal 34b is for supplying reset signal, the contact terminal 34c is for supplying clock signal, the contact terminal 34f is for data input/output signal in both directions, the contact terminal 34g is for supplying write power Vpp, and the contact terminal 34h is the common ground for the power source and the signal. Moreover, the contact terminals 34d and 34e are spare contacts.

Next, referring to FIG. 4, the power circuit unit 38 for a card reader/writer embodying the present invention will be described.

The power circuit unit 38 comprises a DC power source 44, a limiting circuit 46, detection elements 48 and 50, a switching circuit 52, a monitor circuit 54, and a control circuit 56.

The DC power source 44 is for supplying an operating power Vcc through a contact 58a to the terminal 34a for supplying the operating power Vcc to the IC card 12.

On the power line that joins the DC power source 44 to the contact 58a, there are inserted in series the limiting circuit 46 and two detection elements 48 and 50, and the switching circuit 52 is connected in parallel to the detection element 50.

Between the contact 58a and the contact 58b that is pressed against the ground terminal 34h of the IC card 12, there is connected the monitor circuit 54 for monitoring abnormality in the voltage at the output terminal.

The limiting circuit 46 is for limiting the power supply current, and it is controlled by the control signal from the control circuit 56.

The control circuit 56 includes an error amplifier and a reference voltage generator, receives the current values detected by the detection elements 48 and 50 to compare them with the power source current, and supplies a control signal to the limiting circuit 46 to keep the current equal to a predetermined value. Further, the control circuit 56 receives a monitor signal from the monitor circuit 54 and supplies the signal to the main control unit 20, and at the same time receives a signal for changing the detection level of excess current from the main control unit 20.

The switching circuit 52 stays in the state of turned off when the contacts are first pressed against the contact terminals 34, and after their direct contact, the circuit is turned on if no voltage abnormality is detected by the monitor circuit 54.

Next, the operation of the power circuit unit 38 will be described.

When the contact terminals 34 provided on the IC card 12 make contact first with the contacts 58, the switching circuit 52 of FIG. 4 is turned off so that both of the current detection elements 48 and 50 are operating.

Accordingly, the voltage drop between the detection lines ($L_1$ and $L_2$) is large even for a small current so that if there exists a short-circuiting in the IC card 12, then the detected current is fed back to the control circuit 56 and controls the current by operating the limiting circuit 46. Therefore, there will not flow a current that is so large as to weld the contacts 58 of the contact unit. Moreover, the signal $S_1$, which is generated by the voltage monitor circuit 54 s transmitted to the main control unit 20 via the control circuit 56 as a signal $S_2$ to detect whether or not there exists abnormality in the current supply line.

If there is no short-circuiting in the power line, the main control unit 20 can detect normality by the signal $S_2$ from the control circuit 56, and the main control unit 20 drives the switching circuit 52, nullifies the detection element 50, and changes the feedback system between the signals $L_1$ and $L_2$.

Thereafter, the state of the power source is detected by the signal $S_2$ that comes from the monitor circuit 54 through the control circuit 56. If it is found that there is no abnormality, the RESET signal is released from the contact of the signaling system that is making contact with the IC card 12, and is given to the contact terminal 34b. Also, the CLOCK signal is supplied to the contact terminal 34c to drive the IC card 12, and at the same time, transfer of signals is carried out by the use of I/O signal from the contact terminal 34f.

Further, in the first embodiment in the foregoing, use is made of one switching circuit 52 in parallel to one detection element 50. However, the detected signal may be changed stepwise by connecting, for example, four detection elements 60a to 60d and by inserting switching circuits 62a to 62d in parallel to each of the detection elements 60a to 60d.

Figure 6:
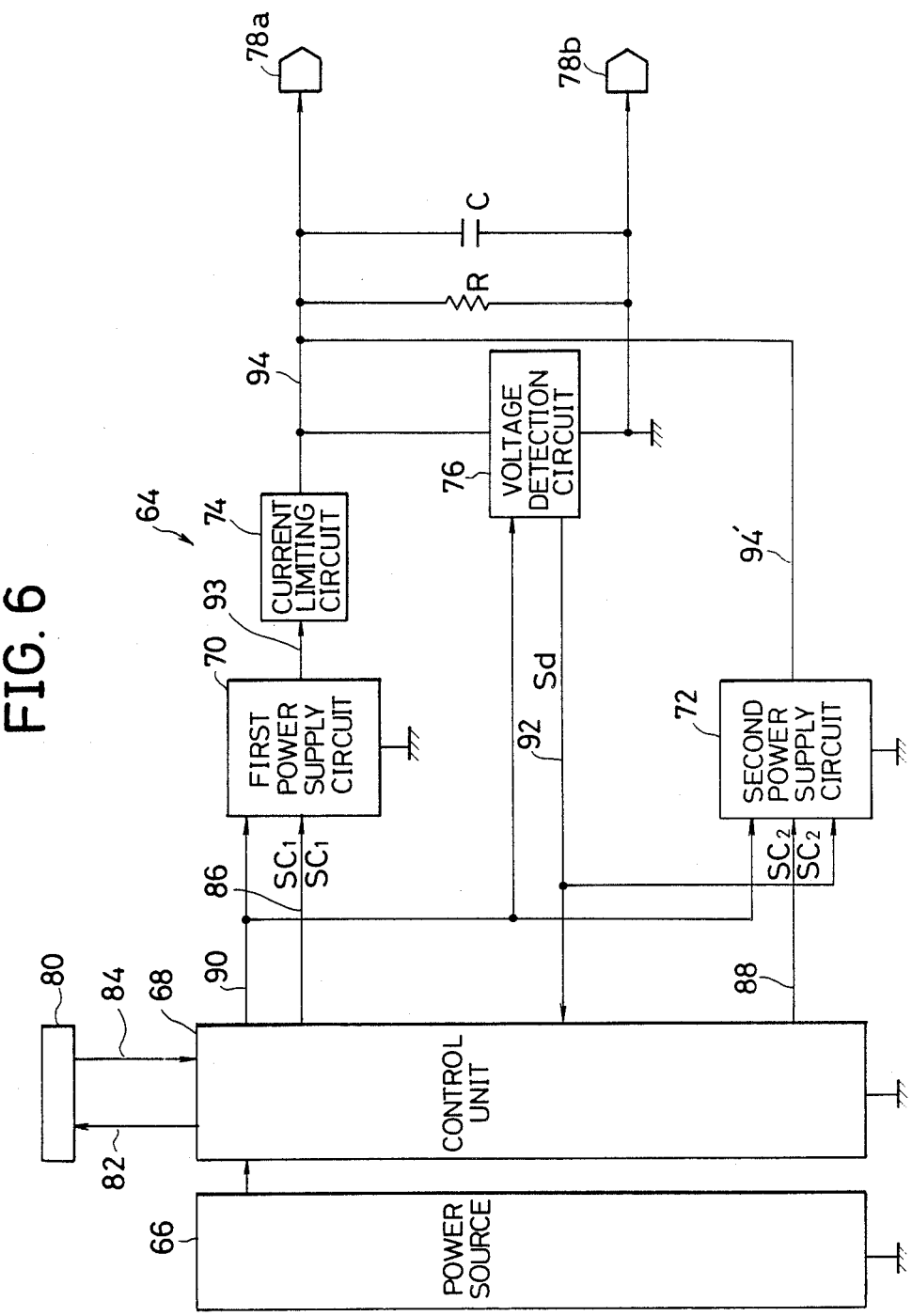
FIG. 6 is a block diagram for the power circuit unit in the second embodiment of the IC card reader/writer in accordance with the present invention.

Next, referring to FIG. 6, a second embodiment of the power circuit unit 64 of the IC card reader/writer in accordance with the present invention will be described.

Here, the second embodiment is similar to the first embodiment so that further description will be omitted except for the power circuit 64 that will be given below.

The power circuit unit 64 comprises a DC power source unit 66, a control circuit 68, a first power supply circuit 70, a second power supply circuit 72, a current limiting circuit, and a voltage detection circuit 76.

The DC voltage from the DC power source unit 66 is supplied as one route, from the DC power source unit 66, via the control unit 68, the first power source supply circuit 70, and the current limiting circuit 74 that are connected in series, to the IC card 12 from a contact 78a, as a first operating voltage. It is also supplied as a second route, from the DC power source unit 66, via the control unit 68, the second power source supply circuit 72 connected similarly in series, to the IC card 12 from the contact 78a, as a second operating voltage. Here, the DC voltage from this power source supply circuit unit is supplied to various parts in the IC card 12 from the contacts 78a and 78h via the contact terminal 34a for supplying the operating voltage Vcc and the contact terminal 34h for the common ground.

The control unit 68 is connected to an interface unit 80 for external connection through which transfer of various kinds of signal with external circuits is carried out. In this example, signal transfer between the control unit 68 and the interface unit 80 for external connection is arranged to be carried out in serial fashion via lines 82 and 84.

Further, the control unit 68 supplies a first control signal $S_{C1}$, and a second control signal $S_{C2}$ to the first power supply circuit 70 and the second power supply circuit 72 via lines 86 and 88, respectively. The first power supply circuit 70 and the second power supply circuit 72 output, upon receipt of the first control signal $S_{C1}$ and the second control signal $S_{C2}$, respectively, from the control unit 68, the DC voltage that is supplied from the DC power source unit 66 via the control unit 68 and the line 90, as an operating voltage. When there are not supplied the first control signal $S_{C1}$ and the second control signal $S_{C2}$, there is not output the operating voltage, that is, there is no supply of an operating voltage to the IC card via the contacts 78a and 78h. Further, the current control circuit 74 is for preventing the voltage, that is output from the first power supply circuit 70, from generating an excess current due, for example, to the short-circuiting of the contacts 78a and 78h, and for limiting the current to a predetermined limiting current value. Here, the predetermined current value is set at a very small value, for example, a value for which welding between the contacts 78a and 78h will not take place.

Moreover, between the contacts 78a and 78h there is connected a voltage detection circuit 76 which monitors the voltage that is supplied to the IC card 12 via the contacts 78a and 78h. If the voltage deviates from a predetermined range, the voltage detection circuit supplies a detection signal Sd to the control unit 68 and the second power supply circuit 72 via a line 92. Here, the voltage detection circuit 76 consists of a reference voltage generator and a comparator, and a detection signal Sd is output from the comparator by comparing the voltage between the contacts 78a and 78h with the reference voltage from the reference voltage generator. Further, between the contacts 78a and 78h there are connected a resistor R and a capacitor C in parallel to the voltage detection circuit 76, forming a smoothing circuit.

Next, the operation of the power circuit unit of the second embodiment will be described.

First, at immediately after the IC card 12 is inserted to the card reader/writer and each of the contacts 78 of the card reader/writer are connected respectively to the corresponding contact terminals 34 of the IC card, as described in the first embodiment, it is arranged by the action of the control unit 68 that the DC voltage from the DC power source unit 66 in the power circuit unit will not be supplied to the IC card. That is, in the state immediately after the contact, the first control signal $S_{C1}$ and the second control signal $S_{C2}$ from the control unit 68 are not supplied to the first power supply circuit 70 and the second power supply circuit 72.

After confirming that the IC card 12 made a complete contact with the card reader/writer, the control unit 68 first supplies via the line 86a first control signal $S_{C1}$ to the power supply circuit 70 to actuate the first power supply circuit alone. As a result, the first power supply circuit 70 outputs via the control unit 68 and the line 90 the DC voltage that is supplied by the DC power source unit 66 as an operating voltage. This operating voltage is supplied from the contacts 78a and 78h to the IC card 12 via the current limiting circuit 74 and a line 94.

In this way, the voltage that is supplied from the first power supply circuit 70 via the current limiting circuit 74 is given to the IC card 12. However, it is arranged by the action of the current limiting circuit 74 that the current that flows will not exceed the predetermined limiting current value.

Now, even if the contacts 78a and 78h are short-circuited due to insertion of such foreign material as an iron plate instead of the IC card 12, it is arranged that the current that flows between the contacts 78a and 78h will not exceed the predetermined limiting current value. Therefore, protection is provided avoiding the welding of the contacts 78a and 78h.

The operating voltage that is supplied in this way from the first power supply circuit 70 via the current limiting circuit 74 through the contacts 78a and 78h to the IC card 12, is monitored as to its voltage value by the current detection circuit 76 that is connected between the contacts 78a and 78h. In this case, when a genuine IC card 12 is connected between the contacts 78a and 78h, the voltage value between the contacts 78a and 78h is at a normal value. Therefore, the voltage detection circuit 76 supplies a detection signal Sd that indicates that the voltage is normal, to the control unit 68 and the second power supply circuit 72. As a result, a second control signal $S_{C2}$ is supplied to the second power supply circuit 72 from the control unit 68, bringing the second power supply circuit 72 to a state that can operate. Then, the second power supply circuit 72 outputs the DC voltage that is supplied from the DC power source unit 66 via the control unit 68 and the line 90, as an operating voltage, and supplies the operating voltage to the IC card 12 from the contacts 78a and 78h via a direct line 94'. As a result, the IC card 12 will be supplied a current by this operating voltage without any particular limitation.

However, when the contacts 78a and 78h are short-circuited by a foreign material such as an iron plate, as mentioned earlier, the current is limited by the current limiting circuit 74, protecting the contacts 78a and 78h. At the same time, the contacts 78a and 78h are short-circuited in this case so that the voltage between the contacts 78a and 78h is at an abnormal value such as zero volts. This abnormal voltage is monitored by the detection circuit 76, and a detection signal Sd that has a voltage above the abnormal voltage is supplied from the voltage detection circuit 76 to the control unit 68 and the second power supply circuit 72. As a result, the control unit 68 does not perform the control that causes the second power supply circuit 72 to operate. At the same time, the second power supply circuit 72 itself will not be operated due to the detection signal Sd from the voltage detection circuit 76. Because of this, an operating voltage will not be supplied from the second power supply circuit 72 to the IC card via the contacts 78a and 78h so that naturally excess current will not flow in this case.

Further, after a normal IC card 12 is inserted and an operating voltage is supplied perfectly directly from the second power supply circuit 72, absence of an abnormality is further discriminated by the detection signal Sd that is supplied from the voltage detection circuit 76 to the control unit 68, as mentioned before. When it is judged that there exists no abnormality, the reset signal is released from the contact of the signaling system that is making contact with the IC card 12 to give the signal to the contact terminal 34b, and also to the clock signal contact terminal 34c to drive the IC card 12. At the same time, transfer of the predetermined signals is carried out by applying I/O signals to the contact terminal 34f.

Figure 7A:
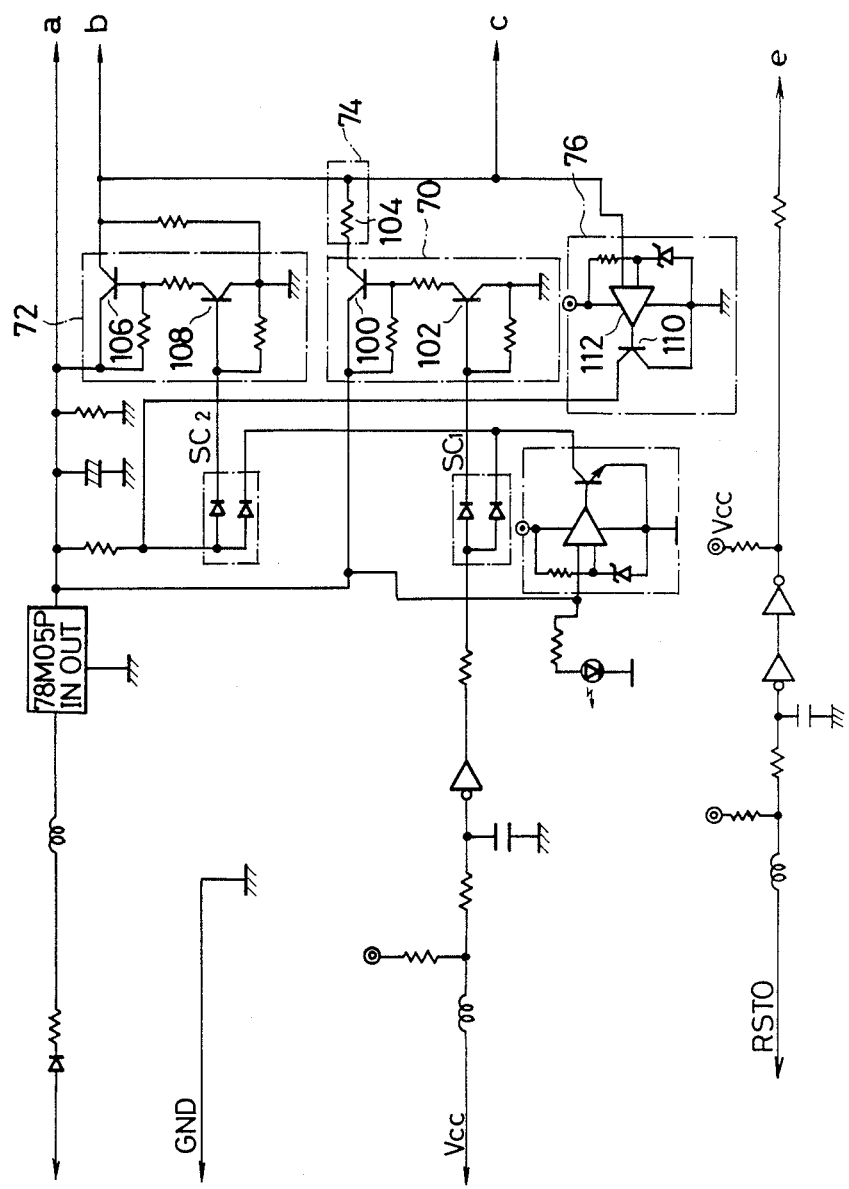
FIGS. 7a and 7b are the concrete construction diagram for the power circuit unit shown in FIG. 6.
Figure 7B:
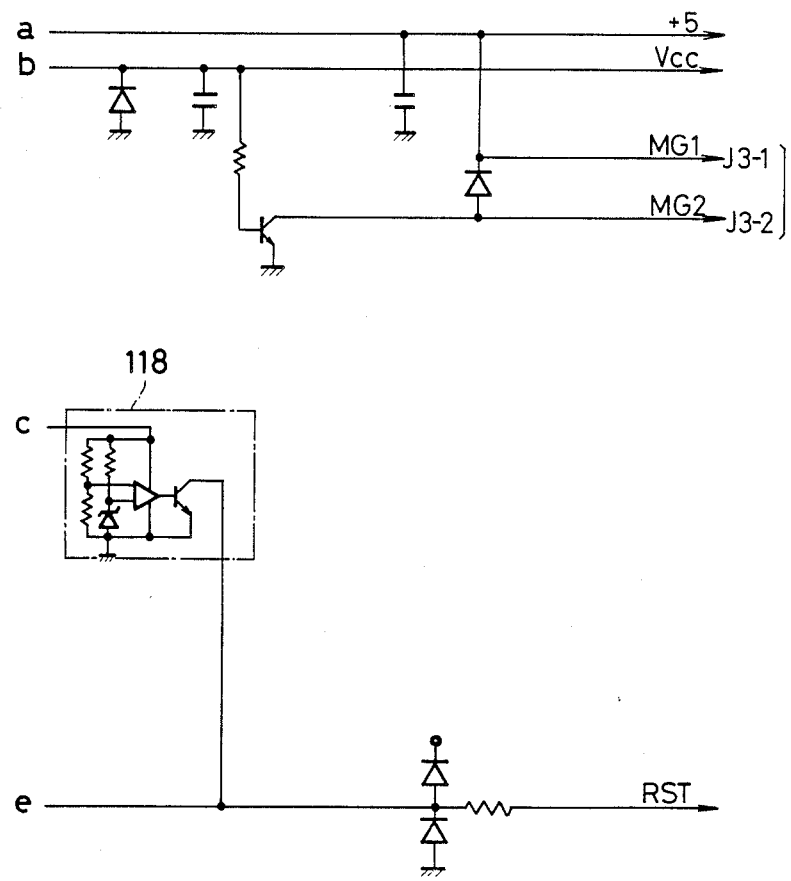

Next, by referring to FIG. 7, a detailed construction example of the power circuit unit 64 of the second embodiment will be described.

In this power circuit unit 64, the first power supply circuit 70 has a PNP transistor 100 which plays the role of a gate that supplies a power current from the control unit 68 to the current limiting unit 74 and an NPN transistor 102 that controls the ON/OFF of the PNP transistor 100 by the control signal $S_{C1}$ from the control unit 68, and the current limiting circuit 74 consists of a resistor 104. The second power supply circuit 72 includes also a PNP transistor 106 that plays the role of a gate that supplies a power current to the contacts 78a, and an NPN transistor 108 that controls the ON/OFF of the PNP transistor 106 by the second control signal $S_{C2}$ of the control unit 68. The voltage detection circuit 76 includes an NPN transistor 110 that plays the role of a gate that short-circuits the power current, and the NPN transistor 110 is connected in such a way as to ON/OFF control the current that flows between the contacts 78a and 78h by the signal that is amplified by an operational amplifier 112. In addition, this concrete example includes a malfunction prevention circuit 118 that outputs a reset signal for protecting the IC card 12.

As described in the foregoing, according to the second embodiment above, when a portable recording medium is connected, an operating power is supplied first from the first power supplying means via a current control means, and when this power supply is normal, an operating power is supplied directly from a second power supplying means. Consequently, even if a foreign material such as an iron plate is inserted instead of a portable recording medium, an excess current is avoided first by the current control means of the first power supplying means so that the current is limited to a small value which is below a predetermined value of the current limiting means. Therefore, power supply terminals or the like will not be welded and the device will not be damaged. This improves the reliability and the safety of the device. Also, an easy damage to the device by mischief such as the insertion of a foreign body can be avoided which leads to an easier handling and to an easier selection of the installation site of the device.

Various modifications will become possible for those skilled in the art after receiving the teachings of the present disclosure without departing from the scope thereof.

What is claimed is:

1. A reader/writer for a portable recording medium which supplies operating power to a pair of contact terminals for the portable recording medium when connected to the portable recording medium, to carry out transfer of information between the portable recording medium and the reader/writer, comprising:
   (a) power supplying means for supplying operating power to the portable recording medium;
   (b) current limiting means connected in series to said power supplying means for limiting a power source current to be supplied to the pair of contact terminals for the portable recording medium;
   (c) abnormality detection means coupled to the pair of contact terminals for detecting abnormality in the supply of operating power to the portable recording medium by detecting the voltage between the pair of contact terminals; and
   (d) switching and controlling means for switching the current limiting means, such that a first power source current is supplied from said power supplying means to the portable recording medium via said current limiting means following connection of the reader/writer to the portable recording medium, and such that a second power source current which is larger than the first power source current is supplied from said power supplying means to the portable recording medium by bypassing at least a portion of the current limiting means when no abnormality in the voltage between the pair of contact terminals is detected by said abnormality detection means.

2. A reader/writer for a portable recording medium which supplies operating power to the portable recording medium when connected to the portable recording medium, to carry out transfer of information between the portable recording medium and the reader/writer, comprising:
   (a) power supplying means for supplying operating power to the portable recording medium;
   (b) current limiting means connected in series to the power supplying means for limiting the current supplied to the portable recording medium below a predetermined value;
   (c) abnormality detection means for detecting abnormality in the supply of operating power to the portable recording medium;
   (d) first means coupled to the power supplying means for supplying a first operating power to the portable recording medium via the current limiting means;
   (e) second means coupled to the power supplying means for supplying a second operating power larger than the first operating power to the portable recording medium bypassing the current limiting means; and
   (f) control means for enabling the first means to supply the first operating power to the portable recording medium following connection of the reader/writer to the portable recording medium, and for enabling the second means to supply the second operating power to the portable recording medium when no abnormality in the supply of the first operating power is detected by the abnormality detection means;

wherein said power supplying means comprises a first power supply circuit for supplying the first operating power to the portable recording medium, and a second power supply circuit, connected to the first power supply circuit in parallel, for supplying the second operating power to the portable recording medium.

3. A reader/writer for portable recording medium as claimed in claim 2, in which said control means comprises a control unit which controls the first and the second power supply circuits so as to supply first, when the portable recording medium is connected, the first operating power to the portable recording medium from said first power supply circuit via said current limiting means, and supplies, only when the supply of the first operating power is normal, the second opeating power directly to the portable recording medium from said second power supply circuit, based on the detection signal from said abnormality detection means that show normality.

4. A reader/writer for portable recording medium as claimed in claim 3, in which said control unit carries out a control so as to interrupt the supply of the second operating power to the portable recording medium from the second power supply circuit when an abnormality in the supply of the second operating power is detected by said abnormality detection means.

5. A reader/writer for portable recording medium as claimed in claim 2, in which said abnormality detection means comprises a voltage detection circuit connected between a pair of contact terminals for the portable recording medium, for outputting an abnormality detection signal to said control means and the second power supply cirucit, when the voltage between the pair of contact terminals deviates from a predetermined range.

6. A reader/writer for portable recording medium as claimed in claim 1, in which said current limiting means comprises a resistor that has a resistance for preventing the flow of an excess current to the portable recording medium.

7. A reader/writer for portable recording medium as claimed in claim 2, in which said first power supply circuit includes a plurality of power supply circuits, and said current limiting means comprises a plurality of resistors that are provided corresponding to each of said plurality of power supply circuits.

8. A reader/writer for portable recording medium as claimed in claim 1, in which said power supplying means comprises a DC power source.

9. A reader/writer for a portable recording medium which supplies operating power to the portable recording medium when connected to the portable recording medium, to carry out transfer of information between the portable recording medium and the reader/writer, comprising:

(a) power supplying means comprising a DC power source for supplying operating power to the portable recording medium;

(b) current limiting means connected in series to the power supplying means for limiting a power source current supplied to the portable recording medium, in which said current limiting means comprises a current limiting circuit that is connected in series to the DC power source, a detection element that is connected in series to the current limiting circuit for detecting a current value from the current limiting circuit, and a control circuit that compares the value of the current detected by the detection element with the power source current for controlling the current limiting circuit so as to bring the current to a predetermined current value;

(c) abnormality detection means for detecting abnormality in the supply of operating power to the portable recording medium; and (d) control means for switching the current limiting means to supply a first operating power to the portable recording medium following connection of the reader/writer to the portable recording medium, and for switching the current limiting means to supply a second operating power larger than the first operating power to the portable recording medium by bypassing at least a portion of the current limiting means when no abnormality in the supply of the first operating power is detected by the abnormality detection means.

10. A reader/writer for portable recording medium as claimed in claim 9, in which the detection element comprises a resistor that has a predetermined resistance value.

11. A reader/writer for portable recording medium as claimed in claim 10, in which said control means comprises a switching circuit that is connected in parallel to the detection element for short-circuiting the detection element so as to generate the second operating power, and a main control unit that controls the switching circuit so as to cause the switching circuit to be turned on, based on the detection signal from said abnormality detection means that shows normality, only when the supply of the first operating power is normal.

12. A reader/writer for portable recording medium as claimed in claim 11, in which said abnormality detection means comprises a voltage detection circuit that is connected between a pair of contact terminals for the portable recording medium and outputs an abnormality detection signal when the voltage between the pair of contact terminals deviates from a predetermined range of values.

13. A reader/writer for a portable recording medium which supplies operating power to the portable recording medium by connecting its power supply terminals to the external terminals of the portable recording medium to carry out inputting and outputting of recording data, comprising:

(a) power supplying means comprising a DC power source for supplying operating power to the portable recording medium;

(b) current limiting means for linmiting a power source current ot be supplied to the power supply terminals, in which said current limiting means comprises a current limiting circuit that is connected in series to the DC power source, a detection element that is connected in series to the current limiting circuit for detecting a current value from the current limiting circuit, and a control circuit that compares the value of the current detected by the detection element with the power source current for controlling the current limiting circuit so as to bring the current to a predetermined current value;

(c) abnormality detection means for detecting abnormality in the supply of operating power to the portable recording medium; and (d) switching and controlling means for switching and controlling the current limiting means in such a manner as to set the power source current at a small value when the external terminals of the portable recording medium are first brought in contact with the power supply terminals to supply a first operating power to the portable recording medium, and to increase the power source current if after contact no abnormality is detected by the abnormality detection means to supply a second operating power larger than the first operating power to the portable recording medium.

14. A reader/writer for portable recording medium as claimed in claim 13, in which the detection element comprises a resistor that has a predetermined resistance value.

15. A reader/writer for portable recording medium as claimed in claim 14, in which said control means comprises a switching circuit that is connected in parallel to the detection element for short-circuiting the detection element so as to increase the power source current, and a main control unit that controls the switching circuit so as to cause the switching circuit to be turned on, based on the detection signal from said abnormality detection means that shows normality, only when the supply of the first operating power is normal.

16. A reader/writer for portable recording medium as claimed in claim 15, in which said abnormality detection means comprises a voltage detection circuit that is connected between the power supply terminals and outputs an abnormality detection signal when the voltage between the power supply terminals deviates from a predetermined range of values.

* * * * *